(12) United States Patent
Huang

(10) Patent No.: US 9,158,077 B2
(45) Date of Patent: Oct. 13, 2015

(54) WAVEGUIDE LENS INCLUDING PLANAR WAVEGUIDE AND MEDIA GRATING

(71) Applicant: HON HAI PRECISION INDUSTRY CO., LTD., New Taipei (TW)

(72) Inventor: Hsin-Shun Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 44 days.

(21) Appl. No.: 13/916,588

(22) Filed: Jun. 13, 2013

(65) Prior Publication Data

US 2014/0177996 A1    Jun. 26, 2014

(30) Foreign Application Priority Data

Dec. 24, 2012   (TW) .............................. 101149425 A

(51) Int. Cl.
| | |
|---|---|
| G02F 1/035 | (2006.01) |
| G02B 6/42 | (2006.01) |
| G02B 6/124 | (2006.01) |
| G02B 6/12 | (2006.01) |
| G02B 6/34 | (2006.01) |
| G02F 1/29 | (2006.01) |

(52) U.S. Cl.
CPC .............. *G02B 6/4206* (2013.01); *G02B 6/124* (2013.01); *G02B 6/1245* (2013.01); *G02F 1/035* (2013.01); *G02B 6/12004* (2013.01); *G02B 6/34* (2013.01); *G02B 2006/1204* (2013.01); *G02B 2006/12142* (2013.01); *G02B 2006/12176* (2013.01); *G02F 2001/294* (2013.01)

(58) Field of Classification Search
CPC .. G02B 6/124; G02B 6/1245; G02B 6/12004; G02B 6/34; G02B 2006/12142; G02B 2006/1204

USPC ........ 385/1–3, 14–15, 37; 359/237–238, 245, 359/251, 254–256
See application file for complete search history.

(56) References Cited

U.S. PATENT DOCUMENTS

| | | | | |
|---|---|---|---|---|
| 5,111,447 | A | * | 5/1992 | Yamashita et al. .......... 369/44.12 |
| 5,128,915 | A | * | 7/1992 | Yamashita et al. .......... 369/44.12 |
| 5,696,856 | A | * | 12/1997 | Van Der Tol .................... 385/11 |
| 6,078,704 | A | * | 6/2000 | Bischel et al. .................... 385/4 |

(Continued)

OTHER PUBLICATIONS

"Fresnel lens in a thin-film waveguide" by Ashley et al, Applied Physics Letters, vol. 33, No. 6, pp. 490-492, 1978.*

*Primary Examiner* — Kaveh Kianni
*Assistant Examiner* — Guy Anderson
(74) *Attorney, Agent, or Firm* — Novak Druce Connolly Bove + Quigg LLP

(57) ABSTRACT

A waveguide lens includes a substrate, a planar waveguide, a media grating, a pair of first electrodes, and a pair of second electrodes. The planar waveguide is formed on the substrate and is coupled with a laser light source, which emits a laser beam having a divergent angle into the planar waveguide. The media grating is formed on the planar waveguide. The pair of first electrodes is configured to change an effective refractive index of the planar waveguide, utilizing an electro-optical effect, when a first modulating electric field is applied, where the effective refractive index is corresponding to a transverse electric wave. The pair of second electrodes is configured to change an effective refractive index of the planar waveguide, utilizing an electro-optical effect, when a second modulating electric field is applied, where the effective refractive index is corresponding to a transverse magnetic wave.

11 Claims, 4 Drawing Sheets

(56) References Cited

U.S. PATENT DOCUMENTS

| | | |
|---|---|---|
| 6,298,180 B1 * | 10/2001 | Ho ................................. 385/15 |
| 6,473,541 B1 * | 10/2002 | Ho ................................. 385/15 |
| 6,594,407 B2 * | 7/2003 | Doi et al. .......................... 385/2 |
| 7,373,047 B2 * | 5/2008 | Nippa et al. .................... 385/40 |
| 7,664,352 B1 * | 2/2010 | Okayama ........................ 385/43 |
| 2002/0009274 A1 * | 1/2002 | Gharavi ......................... 385/122 |
| 2009/0290829 A1 * | 11/2009 | Kuratani et al. .................. 385/2 |

* cited by examiner

WAVEGUIDE LENS INCLUDING PLANAR WAVEGUIDE AND MEDIA GRATING

BACKGROUND

1. Technical Field

The present disclosure relates to integrated optics, and particularly to a waveguide lens.

2. Description of Related Art

Lasers are used as light sources in integrated optics as the lasers have excellent directionality, as compared to typical light sources. However, laser beams emitted by the lasers still have a divergence angle. As such, if the laser is directly connected to an optical element, some divergent rays may not be able to enter into the optical element, decreasing light usage.

Therefore, it is desirable to provide a waveguide lens, which can overcome the above-mentioned problems.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Embodiments will now be described in detail below with reference to the drawings.

Figure 1:
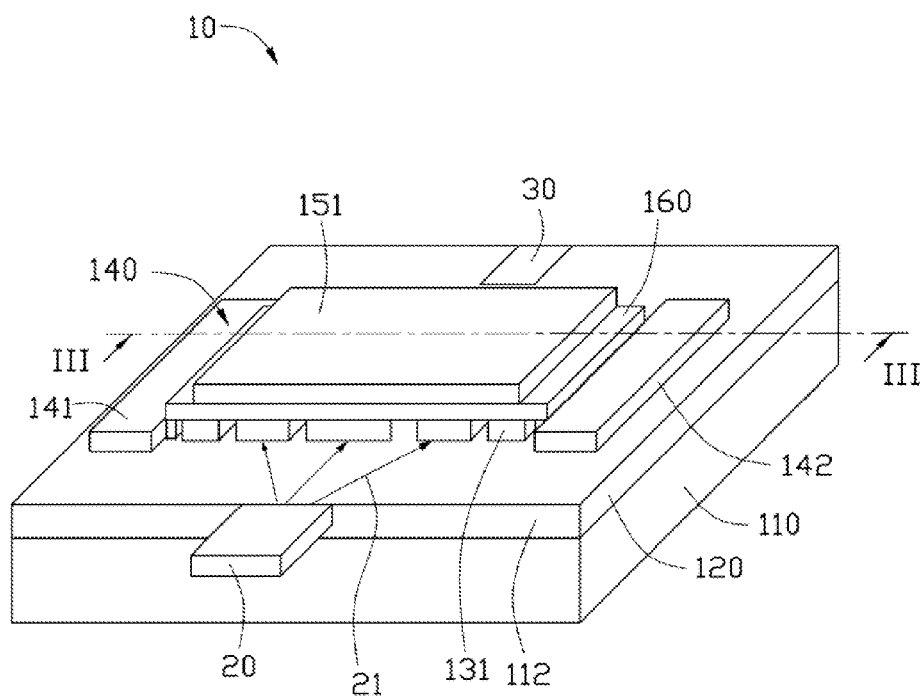
FIG. 1 is an isometric schematic view of a waveguide lens, according to an embodiment.
Figure 2:
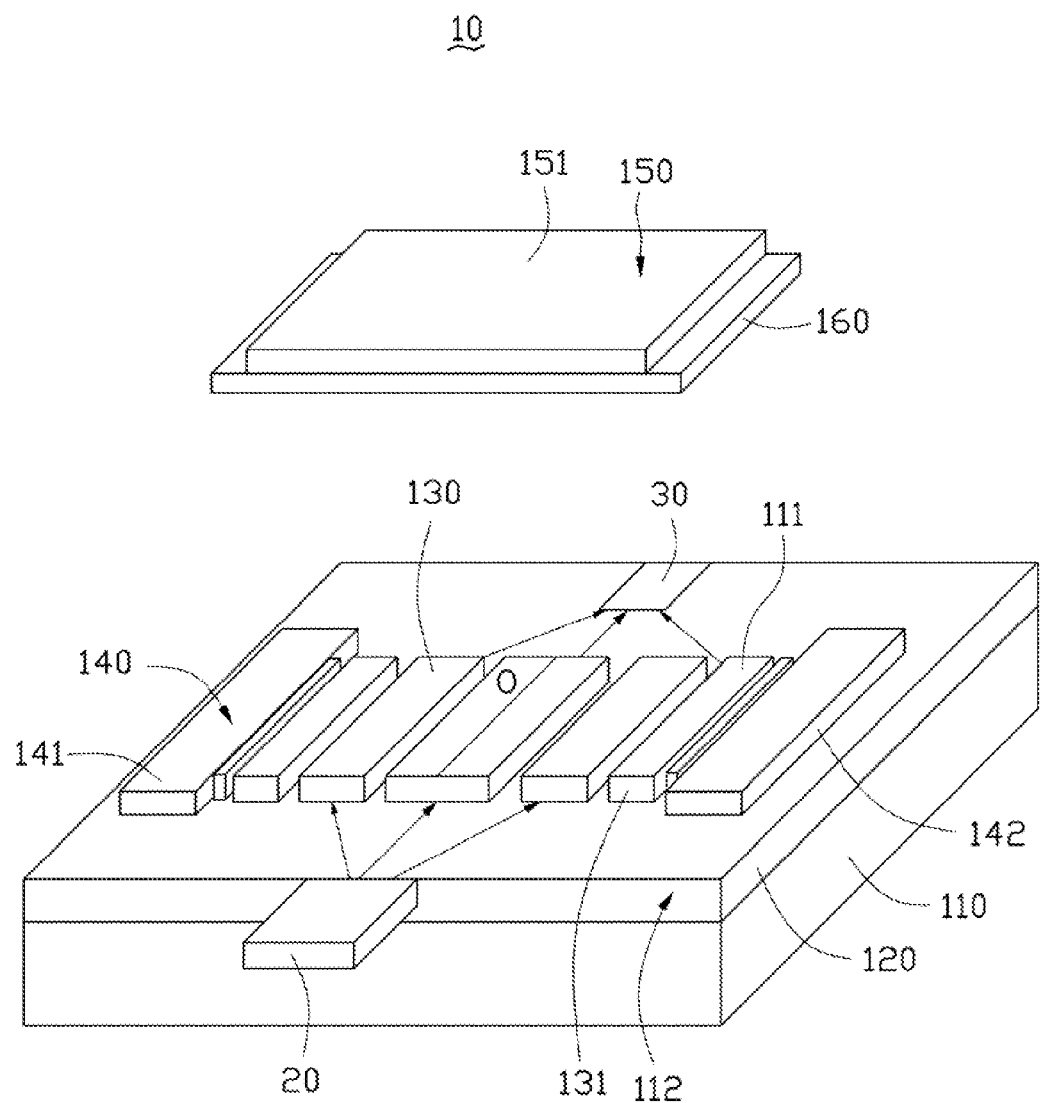
FIG. 2 is an exploded schematic view of the waveguide lens of FIG. 1.
Figure 3:
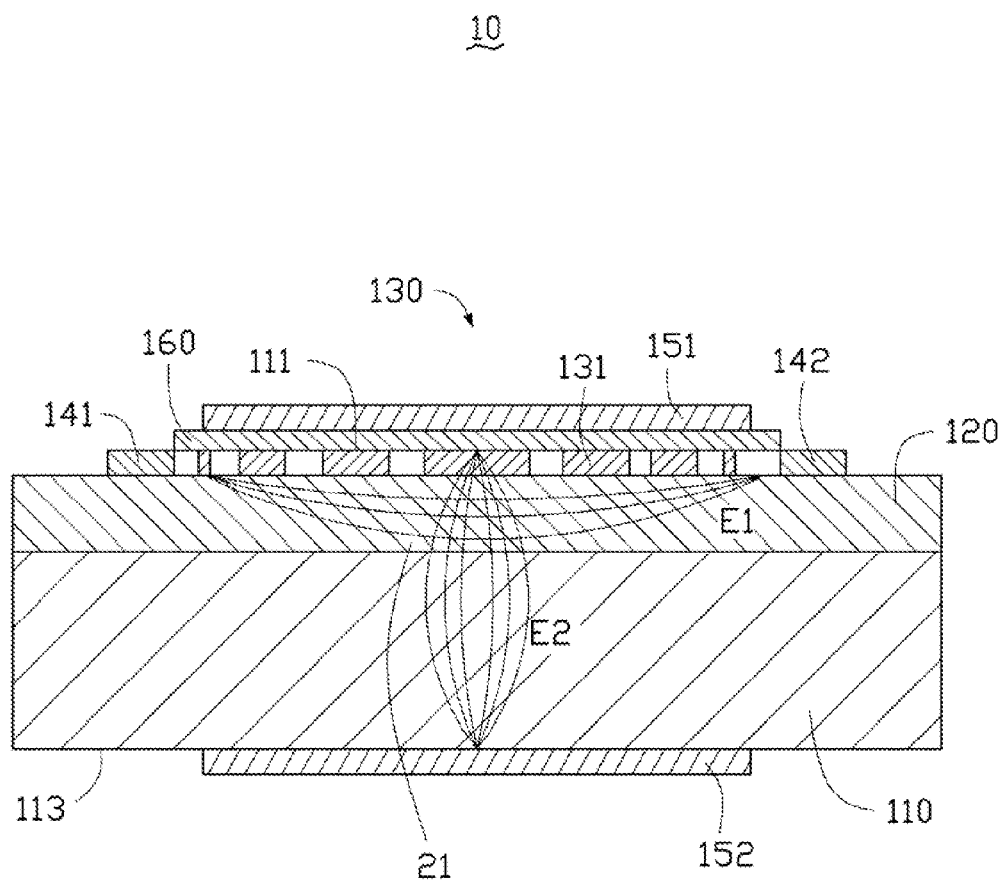
FIG. 3 is a cross sectional view taken along a line III-III line of FIG. 1.

FIGS. 1 to 3 show a waveguide lens 10 according an exemplary embodiment. The waveguide lens 10 includes a substrate 110, a planar waveguide 120 formed on the substrate 110, a media grating 130 formed on the planar waveguide 120, a pair of first electrodes 140, and a pair of second electrode 150.

The substrate 110 is substantially rectangular and includes a top surface 111, a side surface 112 connected with the top surface 111, and a bottom surface 113 opposite to the top surface 111. In this embodiment, the substrate 110 is made of lithium niobate (LiNbO$_3$) crystal, but the disclosure is not limited thereto.

The planar waveguide 120 is formed by coating a film of titanium (Ti) on the top surface 111 and diffusing the Ti into the substrate 110 by a high temperature diffusion technology. That is the planar waveguide 120 is made of LiNbO3 diffused with Ti (Ti:LiNbO3), of which an effective refractive index gradually changes along a widthwise direction, benefitting creation of a diffractive waveguide lens. The planar waveguide 120 is substantially rectangular corresponding to the substrate 110. After the planar waveguide 120 is formed, the top surface 111 becomes an upper surface of the planar waveguide 120, and the side surface 112 becomes a side surface of the planar waveguide 120.

The media grating 130, such as a chirped grating, is formed by etching the upper surface of the planar waveguide 120 (i.e. the top surface 111). That is, the media grating 130 is also made of Ti:LiNbO$_3$. After the media grating 130 is formed, the top surface 111 is an upper surface of the media grating 130. The media grating 130 includes a number of media strips 131. In this embodiment, there are an odd number of the media strips 131. The media strips 131 are symmetrical about the widthwise central axis O of the media grating 130. Each of the media strips 131 is parallel and rectangular. In order form from the widthwise central axis O outwards to each side, width of the media strips 131 decrease, and widths of gaps between each two adjacent media strips 131 also decrease.

The pair of first electrodes 140 is arranged on the planar waveguide 120, and include a first modulating electrode 141 and a first ground electrode 142. The first modulating and the first ground electrodes 141 and 142 are arranged parallel at two opposite sides of the media grating 130.

The pair of second electrodes 150 include a second modulating electrode 151 and a second ground electrode 152. The second modulating electrode 151 overlaying the media grating 130, the second ground electrode 152 is arranged on the bottom surface 113 and is opposite to the second modulating electrode 151.

The planar waveguide 120 is coupled with a laser light source 20 which emits a laser beam 21 having a divergent angle into the planar waveguide 120. The media grating 130 is arranged along a direction that is substantially parallel with an incident direction of the laser beam 21. The media grating 130 and the planar waveguide 120 constitute the diffractive waveguide lens to converge the laser beam 21 into an optical element 30. The pair of first electrodes 140 is configured to change an effective refractive index of the planar waveguide 120, then an effective focal length of the diffractive waveguide lens relative to a transverse electric wave of the laser beam 21 is changed, by utilizing an electro-optical effect, when a first modulating electric field E1 is applied thereto. The transverse electric wave of the laser beam 21 is effectively coupled into the optical element 30. The pair of second electrodes 150 is configured to change an effective refractive index of the planar waveguide 120, then an effective focal length of the diffractive waveguide lens relative to a transverse magnetic wave of the laser beam 21 is changed, by utilizing an electro-optical effect, when a second modulating electric field E2 is applied. The transverse magnetic wave of the laser beam 21 is effectively coupled into the optical element 30.

According to an integrated optics theory, each media grating 130 and the planar waveguide 120 constitute a strip-loaded waveguide. The effective refractive index of portions of the planar waveguide 120 where the media grating 130 is loaded (i.e., a portion of the planar waveguide 120 beneath each media strip 131) is increased. As such, by properly constructing the media grating 130, for example, constructing the media grating 130 as a chirped grating, the media grating 130 and the planar waveguide 120 can function as a chirped diffractive waveguide lens, for example.

By virtue of the first and the second electrodes 140 and 150, and the accompanying modulating electric fields E1 and E2, the effective focal length of the diffractive waveguide lens can be adjusted as desired to ensure an effective convergence of the laser beam 21 into the optical element 30 at any distance from the laser light source 20.

Figure 4:
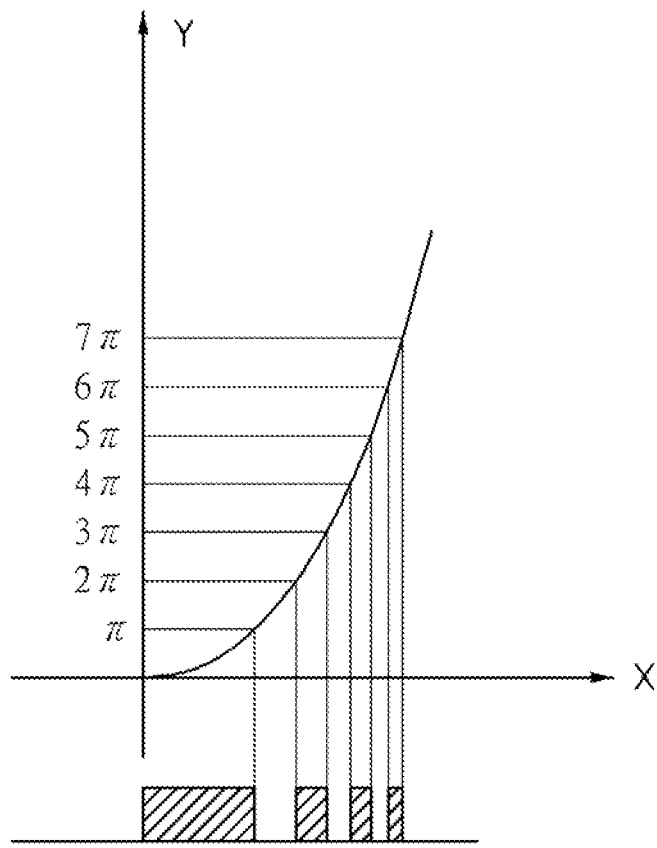
FIG. 4 is a schematic view of a media grating of the waveguide lens of FIG. 1.

In FIG. 4, a coordinate system "oxy" is established, wherein an original "o" is an intersecting point of a widthwise central axis O and a widthwise direction of the media grating 130, "x" axis is the widthwise direction of the media grating

130, and "y" axis is a phase shift of the laser beam 21 at a point "x". According to wave theory of planar waveguides:

$$y=a(1-e^{kx^2}),$$

where x>0, a, e, and k are constants. In this embodiment, boundaries of the media grating 130 are set to conform with the conditions of the formula:

$$y_n=a(1-e^{kxn^2}) \text{ and } y_n=n\pi,$$

where "n" is a positive integer, "$x_n$" is a nth boundary of the media grating 130 along the "x" axis, and "$y_n$" is a corresponding phase shift, $x_n$<0 can be determined by the characteristics of symmetry of the media grating 130.

An inner-pole field is substantially parallel to a direction of the top surface 111, which is generated after the first modulating electric field E1 is loaded into the pair of first electrodes 140. An inner-pole field is substantially perpendicular to the direction of the top surface 111, which is generated after the second modulating electric field E2 is loaded into the pair of second electrodes 150. As such, the modulating electric fields E1 and E2 can effectively modulate the light beam 21 to change the effective refractive index of the planar waveguide 120. A length of each of the first electrodes 140 is longer or equal to a length of the media grating 130, and a height of each of the first electrodes 140 is greater than or equal to a height of the media grating 130.

The laser light source 20 can be a distributed feedback laser (DFB), and is attached to a portion of the side surface 112 corresponding to the planar waveguide 120. An optical axis of the laser light source 20 is aligned with the widthwise central axis O.

The optical element 30 can be a strip waveguide, an optical fiber, or a splitter. In the present embodiment, the optical element 30 is a strip waveguide.

In the embodiment, in order to prevent an optical wave being absorbed by the second modulating electrode 151, a buffer layer 160 can be formed on the media grating 130, then the second modulating electrode 151 can be formed on the buffer layer 160, that is, the buffer layer 160 is arranged between the media grating 130 and the second modulating electrode 151. The buffer layer 160 is made of silicon dioxide (SiO2).

Although the present disclosure has been specifically described on the basis of these exemplary embodiments, the disclosure is not to be construed as being limited thereto. Various changes or modifications may be made to the embodiments without departing from the scope and spirit of the disclosure.

What is claimed is:

1. A waveguide lens, comprising:
   a substrate comprising a top surface and an opposite bottom surface;
   a planar waveguide formed on the top surface of the substrate, the planar waveguide coupled with a laser light source which emits a laser beam having a divergent angle into the planar waveguide;
   a media grating formed on the planar waveguide;
   a pair of first electrodes arranged on the planar waveguide, the pair of first electrodes comprising a first modulating electrode and a first ground electrode; and
   a pair of second electrodes comprising a second modulating electrode and a second ground electrode;
   wherein the first modulating electrode and the first ground electrode are arranged at two opposite sides of the media grating; the second modulating electrode overlaying the media grating; the second ground electrode is arranged on the bottom surface and is opposite to the second modulating electrode; the pair of first electrodes configured to change an effective refractive index of the planar waveguide, utilizing an electro-optical effect, when a first modulating electric field is applied, wherein the effective refractive index is corresponding to a transverse electric wave of the laser beam; the pair of second electrodes configured to change an effective refractive index of the planar waveguide, utilizing an electro-optical effect, when a second modulating electric field is applied, wherein the effective refractive index is corresponding to a transverse magnetic wave of the laser beam.

2. The waveguide lens as claimed in claim 1, wherein the laser light source is attached to a portion of the planar waveguide corresponding to the planar waveguide; the media grating and the planar waveguide constitute a diffractive waveguide lens to converge a laser beam into an optical element.

3. The waveguide lens as claimed in claim 1, wherein the waveguide lens comprises a buffer layer arranged between the media grating and the second modulating electrode.

4. The waveguide lens as claimed in claim 3, wherein the buffer layer is made of silicon dioxide (SiO2).

5. The waveguide lens as claimed in claim 1, wherein the substrate is made of lithium niobate ($LiNbO_3$) crystal.

6. The waveguide lens as claimed in claim 1, wherein the substrate is substantially rectangular and further comprises a side surface is connected with the top surface; the planar waveguide is formed by coating a film of titanium (Ti) on the top surface and then diffusing the Ti into the substrate by a high temperature diffusion technology; the planar waveguide is substantially rectangular, the top surface becomes an upper surface of the planar waveguide, and the side surface becomes a side surface of the planar waveguide.

7. The waveguide lens as claimed in claim 1, wherein the media grating is formed by etching the upper surface of the planar waveguide.

8. The waveguide lens as claimed in claim 7, wherein the media grating is made of lithium niobate crystal diffused with titanium.

9. The waveguide lens as claimed in claim 1, wherein the media grating is a chirped grating; the media grating comprises a number of media strips; there are an odd number of the media strips; the media strips are symmetrical about a widthwise central axis O of the media grating; each of the media strips is parallel and rectangular; in order form from the widthwise central axis O outwards to each side, width of the media strips decrease, and widths of gaps between each two adjacent media strips also decrease.

10. The waveguide lens as claimed in claim 9, wherein an original "o" is an intersecting point of a widthwise central axis O and a widthwise direction of the media grating, "x' axis is the widthwise direction of the media grating, and "y" axis is a phase shift of the laser beam at a point "x"; according to wave theory of planar waveguides:

$$y=a(1-e^{kx^2}),$$

where x>0, a, e, and k are constants; in this embodiment, boundaries of the media grating are set to conform with the conditions of the formula:

$$y_n=a(1-e^{kxn^2}) \text{ and } y_n=n\pi,$$

where "n" is a positive integer, "$x_n$" is a nth boundary of the media grating along the "x" axis, and "$y_n$" is a corresponding phase shift.

11. The waveguide lens as claimed in claim 1, wherein a length of each of the first electrodes is longer or equal to a length of the media grating, and a height of each of the first electrodes is greater than or equal to a height of the media grating.

* * * * *